United States Patent
Lee et al.

(10) Patent No.: US 10,014,521 B2
(45) Date of Patent: Jul. 3, 2018

(54) CATHODE ACTIVE MATERIAL FOR SECONDARY BATTERIES AND SECONDARY BATTERY INCLUDING THE SAME

(71) Applicant: LG Chem, Ltd., Seoul (KR)

(72) Inventors: Bo Ram Lee, Daejeon (KR); Hye Lim Jeon, Daejeon (KR); Sun Sik Shin, Daejeon (KR); Sangwook Lee, Daejeon (KR); Wang Mo Jung, Daejeon (KR)

(73) Assignee: LG Chem, Ltd. (KR)

( * ) Notice: Subject to any disclaimer, the term of this patent is extended or adjusted under 35 U.S.C. 154(b) by 256 days.

(21) Appl. No.: 14/597,428

(22) Filed: Jan. 15, 2015

(65) Prior Publication Data

US 2015/0132651 A1    May 14, 2015

Related U.S. Application Data

(63) Continuation of application No. PCT/KR2013/009937, filed on Nov. 5, 2013.

(30) Foreign Application Priority Data

Nov. 6, 2012 (KR) .................. 10-2012-0124869

(51) Int. Cl.
*H01M 4/36* (2006.01)
*H01M 4/131* (2010.01)
(Continued)

(52) U.S. Cl.
CPC .......... *H01M 4/366* (2013.01); *H01M 4/0402* (2013.01); *H01M 4/0471* (2013.01);
(Continued)

(58) Field of Classification Search
CPC ...... H01M 4/366; H01M 4/62; H01M 4/0471; H01M 4/525; H01M 10/0525;
(Continued)

(56) References Cited

U.S. PATENT DOCUMENTS

| 2003/0087155 A1 | 5/2003 | Cho et al. |
| 2005/0084757 A1* | 4/2005 | Kweon ............ H01M 4/131 |
| | | 429/231.1 |

(Continued)

FOREIGN PATENT DOCUMENTS

| CN | 1414650 A | 4/2003 |
| CN | 102593445 A | 7/2012 |

(Continued)

OTHER PUBLICATIONS

Gao et al. "AlF3-coated Li(Li0.17Ni0.25Mn0.58)O2 as cathode material for Li-ion batteries." Electrochimica Acta (2012) 308-315 available Jun. 2012.*

(Continued)

*Primary Examiner* — Michael L Dignan
(74) *Attorney, Agent, or Firm* — Lerner, David, Littenberg, Krumholz & Mentlik, LLP

(57) ABSTRACT

Provided is a cathode active material including a complex coating layer, which includes M below, formed on a surface of the cathode active material through reaction of a lithium transition metal oxide represented by Formula 1 below with a coating precursor:

$$Li_xMO_2 \qquad (1)$$

wherein M is represented by $Mn_aM'_{1-b}$, M' is at least one selected from the group consisting of Al, Mg, Ni, Co, Cr, V, Fe, Cu, Zn, Ti and B, $0.95 \leq x \leq 51.5$, and $0.5 \leq a \leq 1$. The lithium secondary battery including the cathode active material exhibits improved lifespan and rate characteristics due to superior stability.

17 Claims, 2 Drawing Sheets

(51) Int. Cl.
*H01M 4/1391* (2010.01)
*H01M 4/505* (2010.01)
*H01M 4/04* (2006.01)
*H01M 4/1315* (2010.01)
*H01M 4/485* (2010.01)
*H01M 4/525* (2010.01)
*H01M 10/0525* (2010.01)
*H01M 4/62* (2006.01)
*H01M 10/052* (2010.01)
*H01M 4/02* (2006.01)

(52) U.S. Cl.
CPC ......... *H01M 4/131* (2013.01); *H01M 4/1315* (2013.01); *H01M 4/1391* (2013.01); *H01M 4/485* (2013.01); *H01M 4/505* (2013.01); *H01M 4/525* (2013.01); *H01M 4/62* (2013.01); *H01M 10/0525* (2013.01); *H01M 10/052* (2013.01); *H01M 2004/028* (2013.01)

(58) Field of Classification Search
CPC .. H01M 4/0402; H01M 4/485; H01M 4/1315; H01M 4/505; H01M 4/1391; H01M 4/131; H01M 2004/028; H01M 10/052; Y02T 10/7011; Y02P 70/54; Y02E 60/122
See application file for complete search history.

(56) References Cited

U.S. PATENT DOCUMENTS

| | | | |
|---|---|---|---|
| 2009/0087362 A1* | 4/2009 | Sun | C01G 45/1221 423/179.5 |
| 2010/0167124 A1 | 7/2010 | Seo et al. | |
| 2010/0247986 A1* | 9/2010 | Toyama | H01M 4/366 429/61 |
| 2011/0076556 A1 | 3/2011 | Karthikeyan et al. | |
| 2012/0135305 A1 | 5/2012 | Kim et al. | |
| 2012/0164525 A1 | 6/2012 | Endoh et al. | |
| 2012/0261610 A1* | 10/2012 | Paulsen | H01M 4/131 252/182.1 |
| 2012/0270104 A1* | 10/2012 | Paulsen | H01M 4/131 429/212 |
| 2012/0301786 A1 | 11/2012 | Takamuku et al. | |
| 2013/0122370 A1* | 5/2013 | Rho | H01M 4/5825 429/220 |
| 2013/0136990 A1* | 5/2013 | Li | H01M 4/0471 429/223 |

FOREIGN PATENT DOCUMENTS

| | | |
|---|---|---|
| JP | 2010232001 A | 10/2010 |
| JP | 2012142154 A | 7/2012 |
| JP | 2012142155 A | 7/2012 |
| KR | 2007-0082578 A | 8/2007 |
| KR | 2012-0056674 A | 6/2012 |
| KR | 20120063558 A | 6/2012 |
| WO | 2011054441 A1 | 5/2011 |
| WO | 2011059693 A3 | 9/2011 |
| WO | 2012-022624 A1 | 2/2012 |

OTHER PUBLICATIONS

Park et al. "On the surface modifications of high-voltage oxide cathodes for lithium-ion batteries: new insight and significant safety improvement." J. Mater. Chem. 2010, 20, 7208-7213, available May 2010.*

Wang et al. "Uniform AlF3 thin layer to improve rate capability of LiNi1/3Co1/3Mn1/3O2 material for Li-ion batteries." Trans. Nonferrous Met. Soc. China 20 (2010) 803-808, available May 2010.*

Youyuan Huang, et al., "A modified Al2O3 coating process to enhance the electrochemical performance of Li (Ni1/3Co1/3Mn1/3)O2 and its comparison with traditional Al2O3 coating process." Journal of Power Sources, vol. 195, No. 24, Dec. 15, 2010 pp. 8267-8274.

Extended Search Report from European Application No. 13854079.4, dated Nov. 27, 2015.

International Search Report for PCT/KR2013/009937, dated Feb. 6, 2014.

* cited by examiner

CATHODE ACTIVE MATERIAL FOR SECONDARY BATTERIES AND SECONDARY BATTERY INCLUDING THE SAME

CROSS-REFERENCE TO RELATED APPLICATIONS

The present application is a continuation of International Application No. PCT/KR2013/009937 filed Nov. 5, 2013, which claims priority from Korean Patent Application No. 10-2012-0124869 filed Nov. 6, 2012, the disclosures of which are hereby incorporated herein by reference.

TECHNICAL FIELD

The present invention relates to a cathode active material for secondary batteries surface-treated and a lithium secondary battery including the same. More particularly, the present invention relates to a cathode active material surface-treated by reacting a lithium transition metal oxide having a specific composition with a coating precursor and thereby forming a complex coating layer including a transition metal derived from the lithium transition metal oxide, and a lithium secondary battery including the same.

BACKGROUND ART

As mobile device technology continues to develop and demand therefor continues to increase, demand for secondary batteries as energy sources is rapidly increasing. Among these secondary batteries, lithium secondary batteries, which have high energy density and operating voltage, long cycle lifespan, and low self-discharge rate, are commercially available and widely used.

In addition, as interest in environmental problems is increasing, research into electric vehicles (EVs) and hybrid EVs (HEVs) that can replace vehicles using fossil fuels, such as gasoline vehicles, diesel vehicles, and the like, which are one of the main causes of air pollution, is actively underway. As a power source of EVs, HEVs, and the like, a nickel metal-hydride secondary battery is mainly used. However, research into lithium secondary batteries having high energy density and high discharge voltage is actively underway and some lithium secondary batteries are commercially available.

Lithium ion secondary batteries used in conventional small batteries generally use a lithium cobalt composite oxide having a layered structure as a cathode and a graphite material as an anode. However, in the case of the lithium cobalt composite oxide, cobalt, a main constitution element, is very expensive and the lithium cobalt composite oxide is not sufficiently stable for application to electric vehicles. Therefore, as cathode of a lithium ion battery for electric vehicles, a lithium manganese composite oxide composed of manganese, which is cheap and has superior stability, and having a spinel structure may be proper.

However, in the case of the lithium manganese composite oxide, manganese is eluted to an electrolyte solution by an electrolyte solution during high-temperature storage and, thereby, degrading battery characteristics. Therefore, solutions to prevent this problem are required. In addition, the lithium manganese composite oxide has a drawback that capacity per unit weight is small, when compared to lithium cobalt composite oxides or lithium nickel composite oxides, and thereby increase of capacity per battery weight is limited. Accordingly, when a battery is designed such that the limitation is improved, the battery may be commercialized as a power source of electric vehicles.

Such cathode active materials during charging may reduce stability of a battery cell through exothermic reaction accompanying degradation of a surface structure and drastic structural collapse. Thermal stability is associated with interfacial stability between an electrolyte and a cathode active material. Accordingly, most patent literature uses general coating methods to improve surface stability and disclose a plurality of different coating methods.

When the prior art is taken together, there are two type coating methods, namely, cathode ion coating and anode ion coating. $Al_2O_3$ coating is a representative example of cathode ion coating and an example of anode ion coating includes fluoride, phosphate, and silicate coating. Here, fluoride coating is the most preferable in that the fluoride coating is thermodynamically very stable due to formation of a protective film of LiF and may provide satisfactory stability at high temperature and voltage, since the fluoride coating does not react with an electrolyte. Meanwhile, coating type may be classified into inorganic coating and organic coating, and polymer coating as an example of the organic coating may provide an elastic coating.

However, the conventional coating methods cannot provide satisfactory battery cell stability. As well as, thin and dense LiF films cannot be provided due to a high melting point and poor wetting properties of LiF and polymer coating may deteriorate overall properties of a lithium secondary battery due to problems such as poor electrical conductivity and lithium migration.

Therefore, there is an urgent need for coating technology which may improve stability by protecting a surface of a cathode active material without deterioration of battery characteristics and improve overall properties of a battery.

DISCLOSURE

Technical Problem

Therefore, the present invention has been made to solve the above and other technical problems that have yet to be resolved.

As a result of a variety of extensive and intensive studies and experiments, the inventors of the present invention confirmed that, when a cathode active material, in which a predetermined lithium transition metal oxide reacts with a coating precursor and thereby a complex coating layer comprising a transition metal derived from the lithium transition metal is formed, is used, surfaces of cathode active material particles may be prevented from damage and lithium ion migration characteristics may be improved, and, as such, desired effects may be accomplished, thus completing the present invention.

Technical Solution

In accordance with one aspect of the present invention, provided is a cathode active material including a complex coating layer, which includes M below, formed on a surface of the cathode active material through reaction of a lithium transition metal oxide represented by Formula 1 below with a coating precursor:

$$Li_xMO_2 \qquad (1)$$

wherein M is represented by $Mn_aM'_{1-b}$, M' is at least one selected from the group consisting of Al, Mg, Ni, Co, Cr, V, Fe, Cu, Zn, Ti and B, 0.95≤x≤1.5, and 0.5≤a≤1.

Generally, in lithium manganese-based oxides, irreversible capacity loss is great when a battery is charged and discharged, and rate characteristics are low due to low electrical conductivity. Such problems are deepened with increasing amount of manganese.

The cathode active material according to the present invention includes a predetermined metal coating layer and thereby a surface of a cathode active material particles is protected during high-rate charge/discharge, and, accordingly, stability is improved. In addition, migration characteristics of lithium ions are improved and, as such, reversible discharge capacity and rate characteristics may be improved.

When the amount of the lithium transition metal oxide of Formula 1 is excessively large or small, discharge capacity may be reduced during high voltage charge/discharge. Preferably, the amount of the lithium may be $1 \leq x \leq 1.5$.

A metal of the lithium transition metal oxide according to Formula 1, namely, M is represented by $Mn_aM'_{1-b}$ and the amount of the manganese is in a range to exhibit optimal effects. Therefore, excessively low manganese amount is not preferable. Preferably, the amount of the manganese may be $0.6 \leq a \leq 0.9$. In addition, a metal, namely, M' may be at least one selected from the group consisting of Ni, Co, Cr, V, Fe, Cu, and B.

The lithium transition metal oxide according to Formula 1 may form a complex coating layer including a metal, namely, M, derived from the lithium transition metal oxide by reacting with a first coating precursor and a second coating precursor at the same time.

Such a complex coating layer, for example, may have at least one combination structure selected form the group consisting of Li-M-X, Li-M-m and Li-M-X-m, X may be a halogen element derived from the first coating precursor, and m may be a metal element derived from the second coating precursor.

As an embodiment, the first coating precursor may be an organic or inorganic compound including a halogen element, namely, X. In this regard, X may be F, Cl, Br or I derived from the organic or inorganic compound, particularly F or Cl.

The organic or inorganic compound is not specifically limited so long as the compound includes F, Cl, Br or I. For example, the organic compound may be any one selected the group consisting of PVdF, PVdF-HFP, PVF, PTFE and ETFE, and the inorganic compound may be a lithium salt or ammonium salt including a halogen element.

More particularly, the first coating precursor may be PVdF including F.

As an embodiment, the second coating precursor may be an oxide including a metal, namely, m. In this regard, the metal, namely, m, may be at least one selected from the group consisting of Al, Ba, Ca, Mg, Si, Ti, Zr, Zn, and Sr, derived from the oxide.

The oxide is not limited so long as the oxide includes at least one selected from Al, Ba, Ca, Mg, Si, Ti, Zr, Zn, and Sr. For example, the oxide may be $Al_2O_3$.

As another embodiment, the second coating precursor may be a carbonate-based material including the metal, namely, m. In this regard, the metal, namely, m, may be at least one selected from the group consisting of Al, Ba, Ca, Mg, Si, Ti, Zr, Zn, and Sr derived from the carbonate-based material.

The carbonate-based material is not limited so long as the carbonate-based material includes at least one selected from Al, Ba, Ca, Mg, Si, Ti, Zr, Zn, and Sr. For example, the carbonate-based material may be $CaCO_3$.

As another embodiment, the second coating precursor may be an organic matter including the metal, namely, m. In this regard, the metal, namely, m, may be at least one selected from the group consisting of Al, Ba, Ca, Mg, Si, Ti, Zr, Zn, and Sr derived from the organic matter.

Generally, the organic matter includes C and H, selectively O and the like. The organic matter according to the present invention may further include at least one selected from Al, Ba, Ca, Mg, Si, Ti, Zr, Zn, and Sr, particularly Al, more particularly $C_9H_{21}O_3Al$.

As a specific embodiment, in a complex coating layer having the combination structure described above, the amount of X may be 0.01 to 1.00 wt %, particularly 0.15 to 0.5 wt % based on the total weight of the cathode active material. In addition, the amount of m may be 0.01 to 0.5 wt %, particularly 0.05 to 0.3 wt %, based on the total weight of the cathode active material.

In the complex coating layer, when the amounts of X and m are excessively large, the amount of the lithium transition metal oxide is relatively reduced and thereby desired capacity may not be obtained. On the other hand, when the amounts of X and m are excessively small, desired battery cell stability improvement effects may not be obtained.

A process of preparing such a cathode active material, for example, includes: (a) preparing the lithium transition metal oxide according to Formula 1; (b) coating the first coating precursor and the second coating precursor on the lithium transition metal oxide at the same time; and (c) heat-treating after the coating according to step (b).

A composition formula of the lithium transition metal oxide according to Formula 1, a first coating precursor, and a second coating precursor are the same as described above.

The heat-treatment may be performed, for example, at a temperature range of 250 to 600° C.

The coating of step (b) may be performed using a dry method to prevent deterioration of cathode active material characteristics.

In a specific embodiment, the complex coating layer may be formed on a portion of a surface of the lithium transition metal oxide in a spot form when the high energy milling or dry method-based mixing is used.

Such a coating method is broadly known in the art and thus description thereof is omitted.

The coating of step (b) may be performed using the dry method to prevent deterioration of cathode active material characteristics.

In addition, in step (b), the first coating precursor and the second coating precursor may be used in a mixing ratio of 2:3 to 5:2.

The present invention also provides a cathode mixture for secondary batteries including the cathode active material described above and a cathode for secondary batteries including the cathode mixture.

The cathode mixture may selectively include, in addition to the cathode active material, a conductive material, a binder, a filler and the like.

The conductive material is typically added in an amount of 1 to 30 wt % based on a total weight of a mixture including a cathode active material. There is no particular limit as to the conductive material, so long as it does not cause chemical changes in the fabricated battery and has conductivity. Examples of conductive materials include, but are not limited to, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and a conductive material and in binding of the active material to a current collector. The binder may be typically added in an amount of 1 wt % to 30 wt % based on a total weight of a mixture including a cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, polytetrafluoroethylene, polyethylene, polypropylene, ethylene-propylene-diene terpolymer (EPDM), sulfonated EPDM, styrene-butadiene rubber, fluorine rubber, and various copolymers.

The filler is optionally used as a component to inhibit cathode expansion. The filler is not particularly limited so long as it is a fibrous material that does not cause chemical changes in the fabricated secondary battery. Examples of the filler include olefin-based polymers such as polyethylene and polypropylene; and fibrous materials such as glass fiber and carbon fiber.

The cathode according to the present invention may be prepared by coating and then pressing a slurry, which is prepared by mixing a cathode mixture including the compounds described above with a solvent such as NMP and the like, on a cathode collector.

The cathode current collector is generally fabricated to a thickness of 3 to 500 μm. The cathode current collector is not particularly limited so long as it does not cause chemical changes in the fabricated battery and has conductivity. For example, the cathode current collector may be made of stainless steel, aluminum, nickel, titanium, sintered carbon, or aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

In addition, the present invention provides a lithium secondary battery composed of the cathode, an anode, a separator, and a lithium salt-containing non-aqueous electrolyte solution.

The anode, for example, is prepared by coating and then drying an anode mixture including an anode active material on an anode collector. As desired, the anode mixture may include ingredients as described above.

Examples of the anode active material include, without being limited to, carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Groups I, II and III elements, or halogens; $0 \leq x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, and the like; conductive polymers such as polyacetylene; and Li—Co—Ni-based materials.

The anode current collector is typically fabricated to a thickness of 3 to 500 μm. The anode current collector is not particularly limited so long as it does not cause chemical changes in the fabricated battery and has conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. As in the cathode current collector, the anode current collector may have fine irregularities at a surface thereof to enhance adhesion between the anode current collector and the anode active material. In addition, the anode current collector may be used in various forms including films, sheets, foils, nets, porous structures, foams, and non-woven fabrics.

The separator is disposed between the cathode and the anode and an insulating thin film having high ion permeability and mechanical strength is used as the separator. The separator typically has a pore diameter of 0.01 to 10 μm and a thickness of 5 to 300 μm. As the separator, sheets or non-woven fabrics made of an olefin polymer such as polypropylene, glass fibers or polyethylene, which have chemical resistance and hydrophobicity, are used. When a solid electrolyte such as a polymer is used as the electrolyte, the solid electrolyte may also serve as a separator.

The lithium salt-containing non-aqueous electrolyte solution is composed of an electrolyte solution and a lithium salt. As the electrolyte solution, a non-aqueous inorganic solvent, organic solid electrolyte, inorganic solid electrolyte, and the like are used.

For example, the non-aqueous organic solvent may be an aprotic organic solvent such as N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte. Examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide. Among these, $LiPF_6$ is the most preferable.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte solution. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), fluoro-propylene carbonate (FPC) or the like.

The secondary battery according to the present invention may be used in a battery cell used as a power source of small devices and may also be used as a unit cell of a medium and large-scale battery module including a plurality of battery cells.

The present invention also provides a battery pack including the battery module as a power source of a medium and large-scale device. Examples of the medium and large-scale device include, but are not limited to, electric vehicles (EVs), hybrid EVs (HEVs), and plug-in HEVs (PHEVs); and devices for storing power.

Effects of Invention

As described above, in a cathode active material according to the present invention, a predetermined lithium transition metal oxide forms a complex coating layer including a transition metal derived from a lithium transition metal and thereby the coating layer improves stability by protecting a surface of a cathode active material under high voltage, and, accordingly, lifespan characteristics of a secondary battery including the same may be improved. In addition, migration characteristics of lithium ions are improved and, as such, reversible discharge capacity may be increased and rate characteristics may be improved.

BRIEF DESCRIPTION OF THE DRAWINGS

The above and other objects, features and other advantages of the present invention will be more clearly understood from the following detailed description taken in conjunction with the accompanying drawing, in which.

MODE FOR INVENTION

Now, the present invention will be described in more detail with reference to the following examples. These examples are provided only for illustration of the present invention and should not be construed as limiting the scope and spirit of the present invention.

Example 1

$Li_{1.11}Mn_{0.53}Ni_{0.36}O_2$ powder having a particle size of 5 to 10 μm was prepared. In addition, $NH_4F$ and $C_9H_{12}O_3Al$ were mixed in a mass ratio of 1:1.18 and then mixed with $Li_{1.11}Mn_{0.53}Ni_{0.36}O_2$ powder. In the $Li_{1.11}Mn_{0.53}Ni_{0.36}O_2$ powder, the amount of F is 0.08 wt % and the amount of Al is 0.04 wt %. Subsequently, the resulting mixture was heat-treated at 400° C. for 5 hours, and then was pulverized and sieved.

Comparative Example 1

$Li_{1.11}Mn_{0.53}Ni_{0.36}O_2$ powder having a particle size of 5 to 10 μm was prepared.

Experimental Example 1

Figure 1:
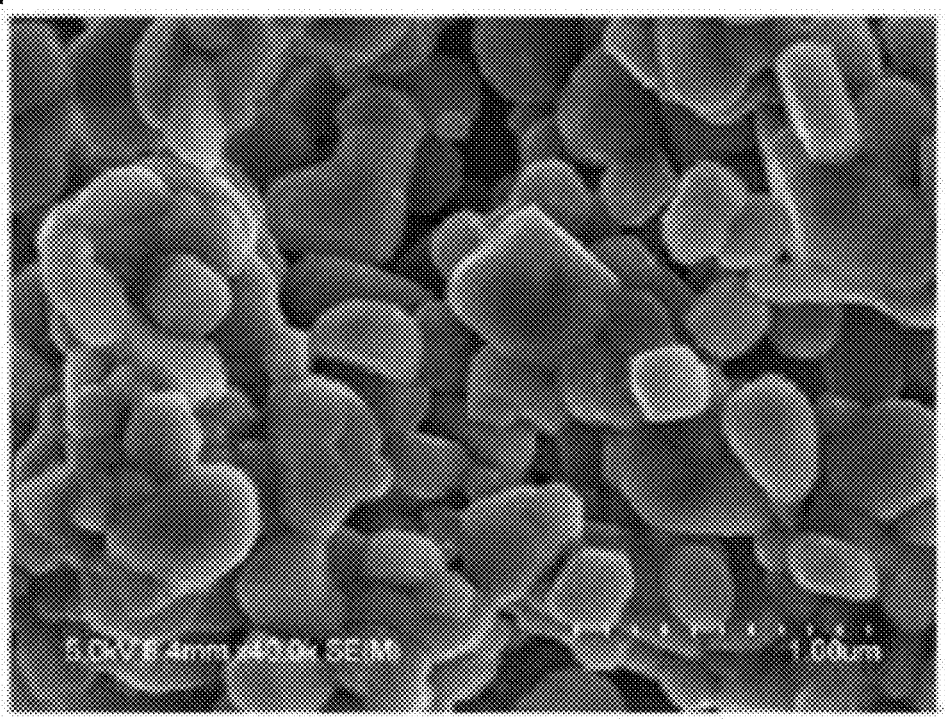
FIG. 1 is a scanning electron microscope (SEM) image of a cathode active material according to Example 1.
Figure 2:
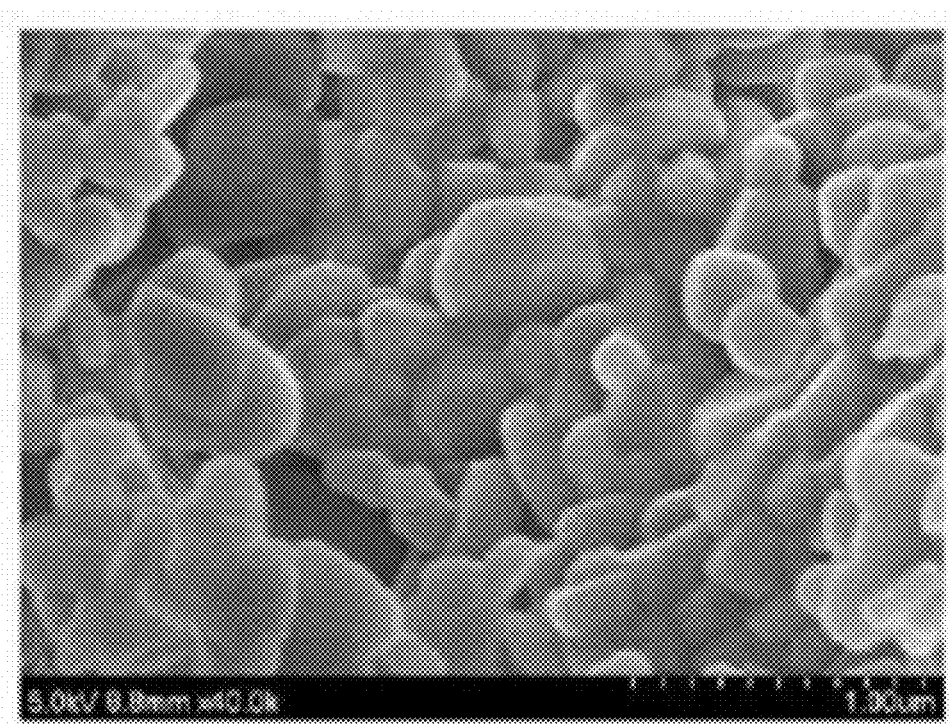
FIG. 2 is an SEM image of a cathode active material according to Comparative Example 1.

SEM images of cathode active materials prepared according to Example 1 and Comparative Example 1 are illustrated FIGS. 1 and 2, respectively.

As shown in FIG. 1, Li-M-F, Li-M-Al, and Li-M-F—Al coating layers formed on a surface of the cathode active material according to Example 1 may be observed.

Experimental Example 2

The cathode active material prepared according to each of Example 1 and Comparative Example 1 was mixed in NMP such that a ratio (wt %) of active material:conductive material:binder was 95:2.5:2.5. Subsequently, the resulting mixtures were coated over aluminum (Al) foil having a thickness of 20 μm and then dried at 130° C., resulting in cathode electrodes. Graphite as an anode active material and a solvent composed of EC, DMC, and DEC mixed in a ratio of 1:2:1 including 1M $LiPF_6$ as an electrolyte solution were used, resulting in batteries. The resulting batteries were charged and discharged at 2.5 to 4.65 V and 0.1 C, and resulting discharge capacities are shown in Table 1 below and FIG. 3.

TABLE 1

| | Example 1 (after coating) | Comparative Example 1 (before coating) |
|---|---|---|
| Discharge capacity at 0.1 C | 219 mAh/g | 213 mAh/g |

Experimental Example 3

The batteries manufactured according to Experimental Example 2 were tested by charging and discharging at 3.0 to 4.4 V and at 0.5 C. Here, lifespan characteristics were estimated by a maintenance ratio with respect to initial capacity after 30 cycles. Results are summarized in Table 2 below and FIG. 4.

TABLE 2

| | Example 1 (after coating) | Comparative Example 1 (before coating) |
|---|---|---|
| Discharge capacity at 0.5 C (lifespan characteristics) | 153.3 mAh/g (90.8%) | 148.3 mAh/g (90.1%) |

Experimental Example 4

Regarding the batteries manufactured according to Experimental Example 2, capacity according to each C-rate with respect to capacity at 0.1 C was calculated by testing rate characteristics at 3.0 to 4.4 V. Results are summarized in Table 3 below.

TABLE 3

| | Example 1 (after coating) | Comparative Example 1 (before coating) |
|---|---|---|
| 0.1 C | 186.6 mAh/g (100%) | 182.6 mAh/g (100%) |
| 0.5 C | 159.6 mAh/g (85.5%) | 153.9 mAh/g (84.3%) |
| 1.0 C | 145.9 mAh/g (78.2%) | 138 mAh/g (75.6%) |

Figure 3:
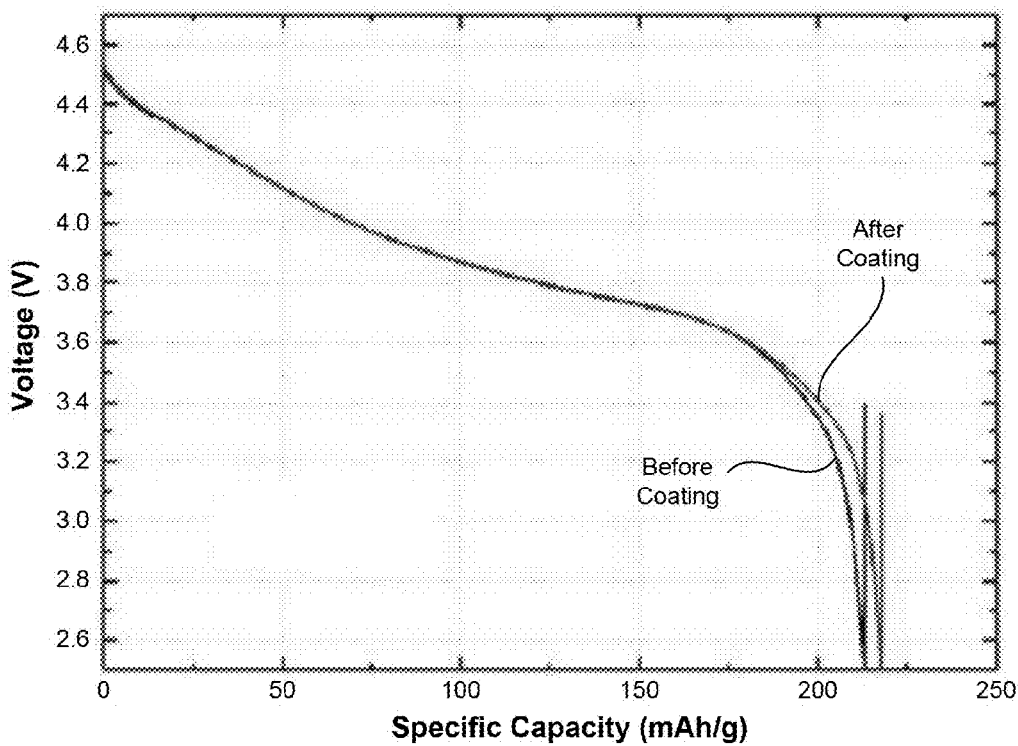
FIG. 3 is a graph illustrating discharge capacity according to Experimental Example 2.
Figure 4:
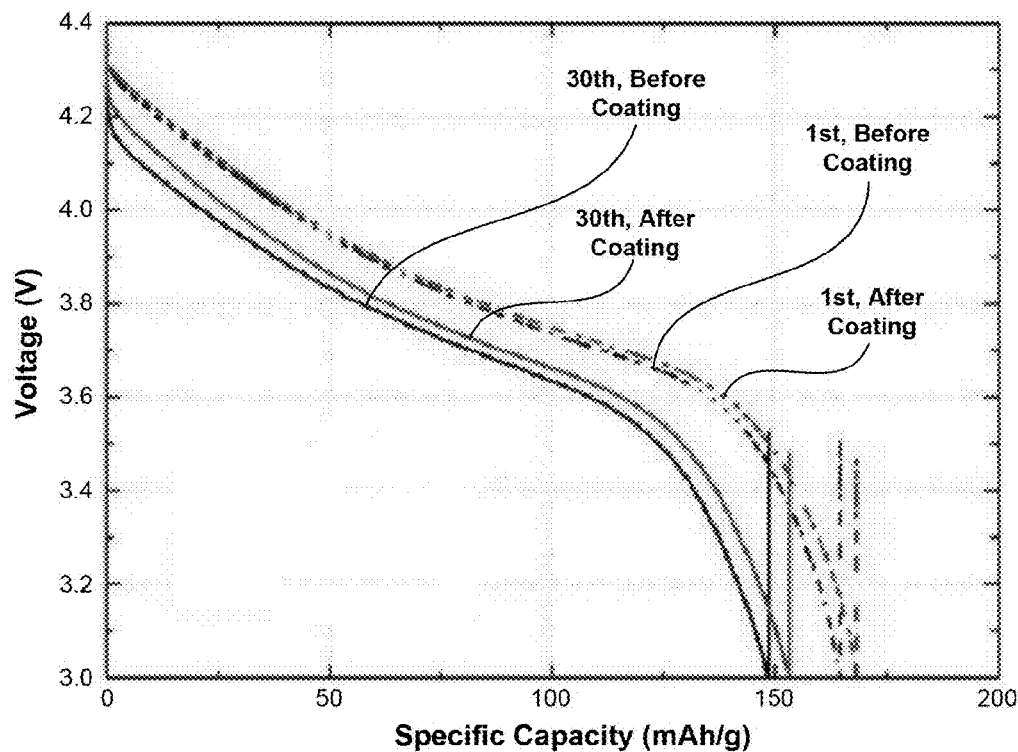
FIG. 4 is a graph illustrating discharge capacity according to Experimental Example 3.

As shown in Tables 1 to 3 and FIGS. 2 to 4, due to Li-M-F, Li-M-Al, and Li-M-F—Al layers formed over the surface of the cathode active material according to Example 1, lifespan and capacity characteristics of the battery using the cathode active material are superior, when compared to the battery using the cathode active material according to Comparative Example 1.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cathode active material comprising a complex coating layer over a surface of a lithium transition metal oxide represented by Formula (1):

$$Li_xMO_2 \quad \text{Formula (1),}$$

wherein M represents $Mn_aM'_{1-b}$ wherein M' is at least one selected from Al, Mg, Ni, Co, Cr, V, Fe, Cu, Zn, Ti, or B wherein $0.95 \leq x \leq 1.5$, $0.5 \leq a \, 1$, and $b=a+x-1$ wherein the complex coating is prepared by:
(a) mixing the lithium transition metal oxide with a first coating precursor and a second coating precursor in a dry method; and
(b) performing a heat treatment to react the lithium transition metal oxide with the first coating precursor and the second coating precursor at the same time to form the complex coating layer over a surface of the lithium transition metal oxide,
wherein the complex coating layer has at least one combination structure selected from Li-M-X, Li-M-m or Li-M-X-m,
wherein X is a halogen element derived from the first coating precursor, and
wherein m is a metal element derived from the second coating precursor,
wherein the first coating precursor is an organic compound comprising a halogen element, X, and X is F, Cl, Br or I.

2. The cathode active material according to claim 1, wherein the organic compound is any one selected from PVdF, PVdF-HFP, PVF, PTFE, or ETFE.

3. The cathode active material according to claim 1, wherein the first coating precursor is PVdF.

4. The cathode active material according to claim 1, wherein the second coating precursor is an oxide comprising a metal, m, and
wherein the metal, m, is at least one selected from Al, Ba, Ca, Mg, Si, Ti, Zr, Zn, or Sr.

5. The cathode active material according to claim 4, wherein the second coating precursor is $Al_2O_3$.

6. The cathode active material according to claim 1, wherein the second coating precursor is a carbonate-based material comprising the metal, m, and
wherein the metal, m, is at least one selected from Al, Ba, Ca, Mg, Si, Ti, Zr, Zn, or Sr.

7. The cathode active material according to claim 6, wherein the second coating precursor is $CaCO_3$.

8. The cathode active material according to claim 1, wherein the second coating precursor is an organic material comprising the metal, m, and
wherein the metal, m, is at least one selected from Al, Ba, Ca, Mg, Si, Ti, Zr, Zn, or Sr.

9. The cathode active material according to claim 8, wherein the second coating precursor is $C_9H_{21}O_3Al$.

10. The cathode active material according to claim 1, wherein the complex coating layer is formed on an area of 60% to 100% of the surface area of the lithium transition metal oxide particles.

11. The cathode active material according to claim 1, wherein, in the complex coating layer, an amount of X is 0.01 to 1.00 wt % based on a total weight of the cathode active material, and an amount of m is 0.01 to 0.50 wt % based on a total weight of the cathode active material.

12. A cathode mixture comprising the cathode active material according to claim 1.

13. A cathode for secondary batteries cathode, wherein the cathode mixture according to claim 12 is coated over a collector.

14. A secondary battery comprising the cathode for the secondary batteries according to claim 13.

15. The secondary battery according to claim 14, wherein the secondary battery is a lithium secondary battery.

16. The cathode active material according to claim 1, wherein the first coating precursor is an inorganic compound comprising a halogen element, X, and X is F, Cl, Br or I, and
wherein the inorganic compound is a lithium salt or an ammonium salt comprising a halogen element.

17. A composition formula for a cathode active material comprising a first coating precursor and a second coating precursor for a complex coating layer over a surface of a lithium transition metal oxide represented by Formula (1) and the lithium metal transition metal oxide represented by Formula (1):

$$Li_xMO_2 \quad (1), \text{ and}$$

wherein the complex coating layer is prepared by:
(a) mixing the lithium transition metal oxide with the first coating precursor and the second coating precursor in a dry method; and
(b) performing a heat treatment to react the lithium transition metal oxide with the first coating precursor and the second coating precursor at the same time to form the complex coating layer over a surface of the lithium transition metal oxide,
wherein M represents $Mn_aM'_{1-b}$,
wherein M' is at least one selected from Al, Mg, Ni, Co, Cr, V, Fe, Cu, Zn, Ti or B,
wherein $0.95 \leq x \leq 1.5$, $0.5 \leq a \leq 1$, and $b=a+x-1$,
wherein the first coating precursor is an organic compound comprising F and is any one selected from PVdF, PVdF-HFP, PVF, PTFE or ETFE,
wherein the second coating precursor is any one selected from an oxide comprising a metal, m, a carbonate-based material comprising the metal, m, or an organic material comprising the metal, m,
wherein m is at least one selected from Al, Ba, Ca, Mg, Si, Ti, Zr, Zn, or Sr,
wherein the complex coating layer has at least one combination structure selected from Li-M-F, Li-M-m or Li-M-F-m,
wherein F is derived from the first coating precursor, and wherein m is a metal element derived from the second coating precursor.

* * * * *